(12) United States Patent
Manor

(10) Patent No.: US 8,908,843 B2
(45) Date of Patent: Dec. 9, 2014

(54) BEAMING TO THE NEXT CONFERENCE OR BETWEEN CONCURRENT CONFERENCES

(75) Inventor: Moni Manor, Mountain View, CA (US)

(73) Assignee: Avaya Inc., Basking Ridge, NJ (US)

( * ) Notice: Subject to any disclaimer, the term of this patent is extended or adjusted under 35 U.S.C. 154(b) by 158 days.

(21) Appl. No.: 13/426,332

(22) Filed: Mar. 21, 2012

(65) Prior Publication Data

US 2013/0251132 A1  Sep. 26, 2013

(51) Int. Cl.
*H04M 3/42* (2006.01)
(52) U.S. Cl.
USPC .................................................... 379/202.01
(58) Field of Classification Search
USPC ............... 370/260, 261, 262; 379/202.01; 455/416
See application file for complete search history.

(56) References Cited

U.S. PATENT DOCUMENTS

| | | | |
|---|---|---|---|
| 7,885,396 B2* | 2/2011 | Liang et al. | 379/202.01 |
| 2005/0078613 A1 | 4/2005 | Covell et al. | |
| 2006/0233120 A1 | 10/2006 | Eshel et al. | |
| 2011/0051917 A1 | 3/2011 | Chen et al. | |
| 2011/0103373 A1* | 5/2011 | Shatsky et al. | 370/352 |
| 2011/0182415 A1* | 7/2011 | Jacobstein et al. | 379/202.01 |
| 2011/0267987 A1* | 11/2011 | Asthana et al. | 370/260 |
| 2011/0314166 A1* | 12/2011 | Axell et al. | 709/227 |
| 2012/0163576 A1* | 6/2012 | Bentley et al. | 379/202.01 |

FOREIGN PATENT DOCUMENTS

| | | |
|---|---|---|
| EP | 1109352 | 6/2001 |
| EP | 2043349 | 4/2009 |

OTHER PUBLICATIONS

Barnes et al., Centralized Conferencing Manipulation Protocol draft-ietf-xcon-ccmp-06, Feb. 17, 2010, Internet Engineering Task Force (IETF), Internet-Draft, Abstract, pp. 30, 32-35.*
Extended Search Report for European Patent Application No. 12185799.9, dated Jul. 2, 2013 6 pages.

* cited by examiner

*Primary Examiner* — Oleg Asanbayev
(74) *Attorney, Agent, or Firm* — Sheridan Ross P.C.

(57) ABSTRACT

A conferencing system and method are described which enable conference participants to beam between back-to-back or concurrent conferences. Specifically, a conference participant is allowed to beam between two or more conferences by providing in-band signaling during a conference. The in-band signaling may include one or more commands to beam the conference participant between the two or more conferences without requiring the conference participant to hang up and redial the conference number.

20 Claims, 5 Drawing Sheets

BEAMING TO THE NEXT CONFERENCE OR BETWEEN CONCURRENT CONFERENCES

FIELD OF THE DISCLOSURE

The present disclosure is generally directed toward communications and more specifically toward multi-party communications.

BACKGROUND

Currently, audio and web-based conferencing requires that the conference host and the conferencees join a conference using a unique participation code (in the case of non-controlling participants) or host code (in the case of controlling participants or conference hosts). The participants (controlling and non-controlling) of the conference call into a central conference number where they are prompted to enter a unique participation/host code that allows them to participate in the conference. The unique participation/host code allows the user to connect to a switch or to a portion of a conference server processor (e.g., a conference bridge or mixer) that is dedicated to the conference. The dedicated portion of the processor or the switch creates a common connection between all participants in the conference that allows each participant to communicate with all other participants at the same time.

A unique participation/host code is used to restrict access to the conference and ensure its security. Since the unique participation/host code is used as a security measure, the unique participation/host code is typically a pseudo-random collection of alphanumeric characters. Unless a participant knows the unique participation code or host code to join a conference, the participant will not be able to connect to the dedicated portion of the server or the switch that is connecting all of the other participants.

A well-known problem exists with regard to back-to-back conferences and entry of the bridge and participant/host codes when there is no "down" time between conferences.

Others have tried to improve the art by having the bridge outcall to participants. This is problematic because not all participants will be on time, and they are faced with putting the next conference on hold while finishing on the current conference.

U.S. Patent Publication No. 2011/0051917, the entire contents of which are hereby incorporated herein by reference, seeks to solve the problem by adding the notion of a conference waiting room that allows non-controlling participants to talk prior to the host joining and also allows participants to do inter-conference signaling to alert others if they will be late, joining in a moment, etc. This application better suits the dynamics of back-to-back conferences.

Unfortunately, there is still a requirement for the participant transferring from one conference to the next conference to hang up on the first conference, redial the conference number, and then enter a new participation/host code as appropriate before the participant is allowed to join the next conference. It would be desirable to reduce the amount of time and effort that is required for a participant to transfer from one conference to the next.

From a conferencing server point of view, the top of the hour which is when many people disconnect and connect to a new conference is a very busy time. The activity in dropping down a call, setting up the new one, and processing the entry code, is much bigger than just processing the new entry code.

SUMMARY

It is with respect to the above issues and other problems that the embodiments presented herein were contemplated. In particular, embodiments of the present disclosure propose the ability to signal the desire to transfer from one conference to another and enter the participation code without having to hang up and redial. In particular, a number of different embodiments of providing in-band signaling to transfer or toggle between conferences are described.

In some embodiments, a user is allowed to dial a special Telephone User Interface (TUI) code (e.g., '*8' meaning '*T' as a special command for 'transfer') to go to another new conference call without hanging up and dialing again into the conference bridge. In this embodiment, the user is engaged in a first conference call and simply enters the TUI code, followed by the participant/host access code to start or join the new conference call. After receiving the TUI code and the access code, the conference server then transfers the participant's communication device to the new conference. The transfer is made possible without requiring the user to hang up and redial the conference number (e.g., conference bridge).

In some embodiments, a Counter Mode with Cipher Block Chaining Message Authentication Code Protocol (CCMP or CCM mode Protocol), can be used to initiate the transfer operation. This embodiment may be used in lieu of or in addition to the use of a TUI code as described above. In this embodiment, the CCMP command is transmitted from the participant's communication device to the conference service and the CCMP command indicates the participant's desire to transfer between conferences. At the same time or subsequent to providing the CCMP command, the participant may also provide a participant/host code for the particular conference they are transferring to. After receiving the CCMP command and the access code for the new conference, the conference server then transfers the participant's communication device to the new conference.

In some embodiments, one or more Session Initiation Protocol (SIP) messages may be used to initiate the transfer. The use of one or more SIP messages may be used in lieu of or in addition to the use of the special TUI and/or CCMP code. In this embodiment, the conference server may send a SIP REFER message to the participant's communication device where the Refer-To header has the new conference focus Uniform Resource Identifier (URI)+token per RFC4579, the entire contents of which are hereby incorporated herein by reference. The participant's communication device then starts a new dialog and sends a new INVITE to the new conference and terminates/BYE the old dialog with the old conference. Alternatively, the participant's communication device may place the old conference on hold rather than sending a BYE message to terminate the dialog.

In some embodiments, a participant may be allowed to toggle back and forth between two conferences of interest that are being run concurrently using any of the above-described mechanisms (e.g., TUI code, CCMP code, SIP message, combinations thereof, etc.).

In some of the embodiments, the system might have prior knowledge of the participants code (for instance by looking at ones calendar), and the beaming will occur without prompting the user for the new code. Moreover, if a participant inadvertently enters a participant code as the new code, the system may be able to determine that the participant is actually scheduled to be a host for the next conference (e.g., because this information is indicated in the participant's calendar or because the participant is connecting with their personal bridge where they are always a host). Upon making such a determination, the system may ignore the participant's entry of the participant code and allow the participant to join the new conference as a host of the conference after the participant has re-entered the appropriate host code, thereby relieving the participant of first hanging up and then re-entering a host code for the conference. The same mechanism can be used to accommodate situations where a participant inadvertently enters a host code rather than a participant code.

As would be apparent to one schooled in this art, other variations such as audio, audio/video, and other conferencing and collaboration methods would benefit from this method and variations thereof, without departing from the intended scope of the disclosure. Although embodiments of the present disclosure will primarily be described in connection with the use of participation codes, it should be appreciated that embodiments described herein can be used for host codes. In such an embodiment, however, it may be useful to ensure that the conference bridge does not terminate, mute, or play music on hold once the host leaves the session.

In accordance with at least some embodiments of the present disclosure, a method is provided which generally comprises:

receiving, during a first conference call, a command from a first participant of the first conference call to be beamed from the first conference call to a second conference call, wherein the first conference call is facilitated by a conferencing service at a first location;

receiving information that identifies a location of the second conference call, wherein the second conference call is facilitated by the conferencing service at a second location and wherein the second conference call requires the first participant to provide at least one of a different participation code and host code from the first conference call; and beaming the first participant to the second conference call without requiring the first participant to hang up.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
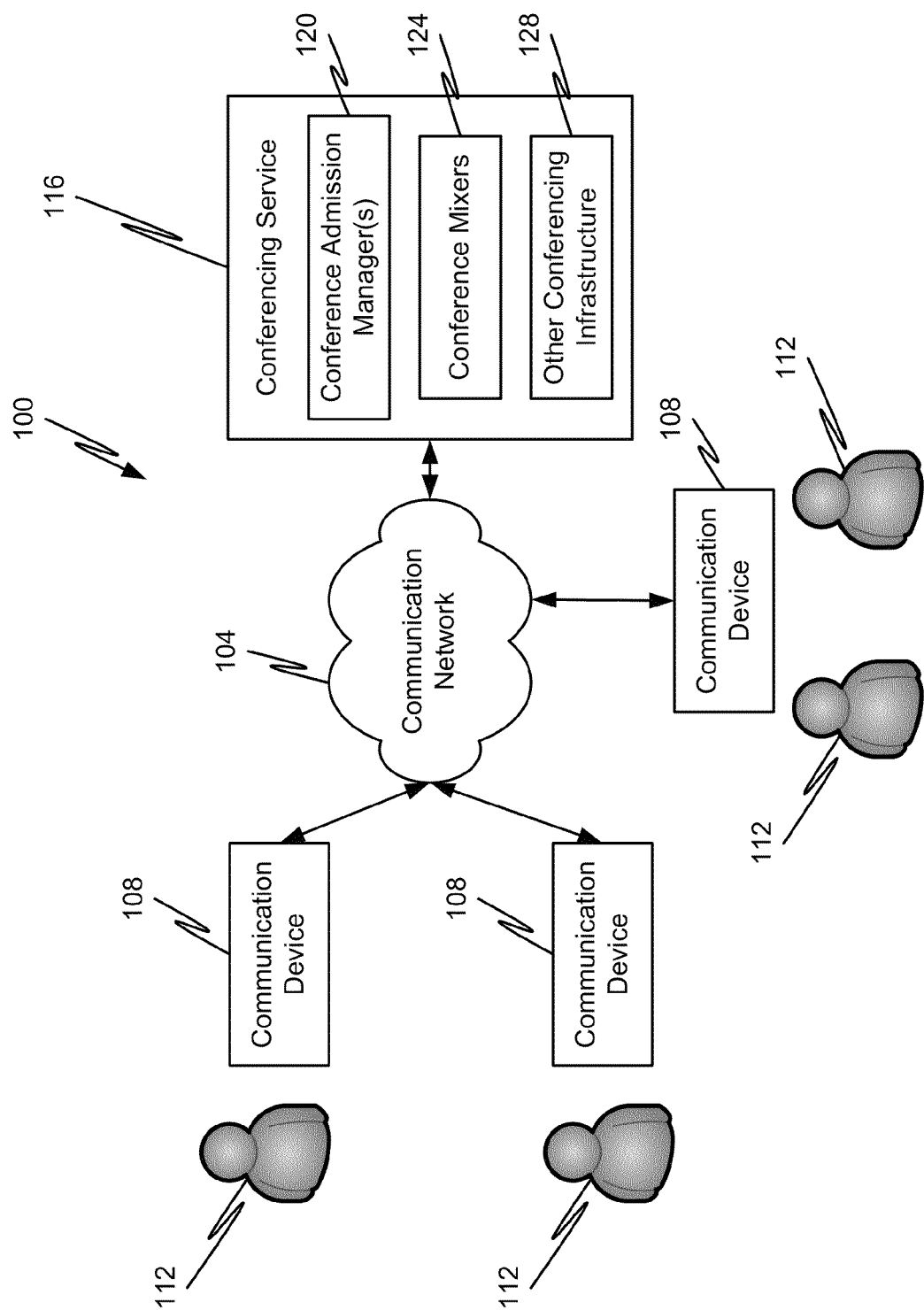
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a conferencing service 116, which may be owned and operated by an enterprise administering communication solutions to one or multiple other enterprises, non-enterprise users, and the like.

In accordance with at least some embodiments of the present disclosure, the communication network 104 may comprise any type of known communication medium or collection of communication media and may use any type of protocols to transport messages between endpoints. In particular, the communication network 104 may support synchronous, asynchronous, real-time, near-real-time, and any other type of electronic communications between two or more communication devices 108.

The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. In particular, some communication devices 108 may connect to the conferencing service 116 via a first network type whereas other communication devices 108 may connect to the conferencing service 116 via a second different network type. The conferencing service 116 may provide the facilities to exchange media and other data between two, three, four, five, or more communication devices either synchronously or asynchronously.

The communication devices 108 may correspond to any collection of components that enable users 112 to exchange media (e.g., voice, video, etc.), data (e.g., emails, Short Message Service (SMS) messages, Multimedia Message Service (MMS) messages, files, presentations, documents, etc. with one another's communication devices 108 over the communication network 104.

The conferencing service 116 provides conferencing resources (e.g., conferencing hardware and/or software) and allows the various users 112 (whether enterprise or non-enterprise) to lease, borrow, or otherwise temporarily use parts of the conferencing resources to engage in conference calls with one another. As can be appreciated, while concepts of the present disclosure will be discussed primarily in connection with conference calls, embodiments of the present disclosure are not so limited. In particular, concepts described herein may be applied to one or more of audio-based conference calls, video-based conference calls, multimedia conferences, web conferences, etc. The types of resources provided by the conference service 116 may depend upon the type and/or size of conference that is provided by the conferencing service 116. In some embodiments, the conferencing service 116 may be capable of facilitating conferences of one or more media types for two, three, four, five, . . . , one hundred, etc. participants.

Examples of the resources that may be included in the conferencing service 116 are one or more conference admission managers 120, one or more conference mixers 124, and other conferencing infrastructure 128. The collective resources of the conferencing service may be made available to users 112 by a telephone number (in the case of an audio or video conference), SIP address, and/or a Uniform Resource Locator (URL) in the case of a web conference. In particular, various communication devices 108 may access the conferencing service 116 by dialing a particular telephone number (e.g., local telephone number, toll free telephone number, etc.). Alternatively, or in addition, the conferencing service 116 can be accessed when a user 112 enters a particular URL into a web browser on their communication device 108. It should also be appreciated that multimedia conferences may be accessed by one or both of a telephone number and URL.

Upon establishing a connection with the conferencing service 116, the communication device 108 may be connected with a conference admission manager 120. In some embodiments, the conference admission manager 120 may comprise Interactive Voice Response (IVR) or some other automated response components that enables the user 112 to interact with the conferencing service 116 in an automated fashion. In particular, the initial interaction between a user 112 and the conference admission manager 120 may involve a question and response process whereby the conference admission manager 120 prompts the user 112 to enter a participation or host code to access a particular conference that is being hosted by a particular conference mixer 124. The prompt may be provided to the communication device 108 as an audio prompt (e.g., in the case of a voice or video-based IVR), a screen prompt presented by a webpage (e.g., in the case of a web conference), or combinations thereof.

The user 112 may respond to the prompt by entering the participation or host code into a touch-tone keypad of the communication device 108, possibly followed by pressing the '#' sign. This exchange involves the transmission of Dual-Tone Multi-Frequency (DTMF) signals from the communication device 108 to the conferencing service 116. Alternatively, or in addition, the user 112 may speak the participation or host code into the communication device 108 and the conference admission manager 120 may analyze the user-provided response in either its audio form or in a text form if the audio content has been converted to text. Alternatively, or in addition, the user 112 may type the participation or host code into a keyboard (e.g., a QWERTY keyboard) and the alphanumeric input provided by the user 112 to the communication device 108 may be communicated to the conference admission manager 120 for analysis. Alternatively the system might have prior knowledge of the participant code (for instance by looking at the user's calendar, or by beaming to the user's own bridge) and the user won't be prompted for the host code. Any other type of known analysis may be performed by the conference admission manager 120 to determine if a user 112 is allowed to be a participant in a conference. As can be appreciated, the type of analysis performed by the conference admission manager 120 may vary depending upon the type of connection between the communication device 108 and the conferencing service 116 (e.g., whether the connection is of a particular media type).

Upon determining that a user 112 has entered a valid participation or host code in the communication device 108 (or a group of users 112 sharing a communication device 108 has entered a valid participation or host code), the conference admission manager 120 may be configured to transfer or otherwise establish a communication session between the communication device 108 and a conference mixer 124 (e.g., by establishing a real-time media channel such as an RTP or SRTP connection, by serving one or more HTML documents to the communication devices 108 of the participants, or the like). More specifically, in some embodiments, the conferencing service 116 may comprise a plurality of mixers (or similar media combiners) that enable real-time and near-real-time collaboration among a plurality of communication devices 108. The mixers 124 may be dedicated to a particular conference for a predetermined amount of time as dictated by scheduling within the conferencing service 116. Any type of known mixer 124 may be used without departing from the scope of the present disclosure.

In some embodiments, the mixer 124 may be configured to negotiate codecs with each communication device 108 connected thereto to enable an efficient and satisfactory mixing of media from the various communication devices 108. The mixer 124 used for a particular conference may be configured to receive the inputs from each participant's communication device 108, mix the received inputs into a combined signal that is specifically tailored for each participant (e.g., participant 1 gets a mixed signal of participants 2 and 3, participant 2 gets a mixed signal of participants 1 and 3, and participant 3 gets a mixed signal of participants 1 and 2), and provide the combined signals back to each communication device 108 as appropriate.

As can be appreciated, each of the different mixers 124 may be assigned a different participation code and/or host code. Alternatively, each of the different mixers 124 may be assigned to conferences on an as-needed basis. Any other mixer 124 assignment scheme may be employed.

The other conferencing infrastructure 128 may include other hardware and/or software resources of the conferencing service 116 that facilitate conferencing and other forms of collaboration. Examples of other conferencing infrastructure 128 include, without limitation, one or more web servers that support document collaboration in real-time or near-real-time, media processors (e.g., echo cancellation devices, media buffers, etc.), additional media ports or mixers, and the like.

Figure 2A:
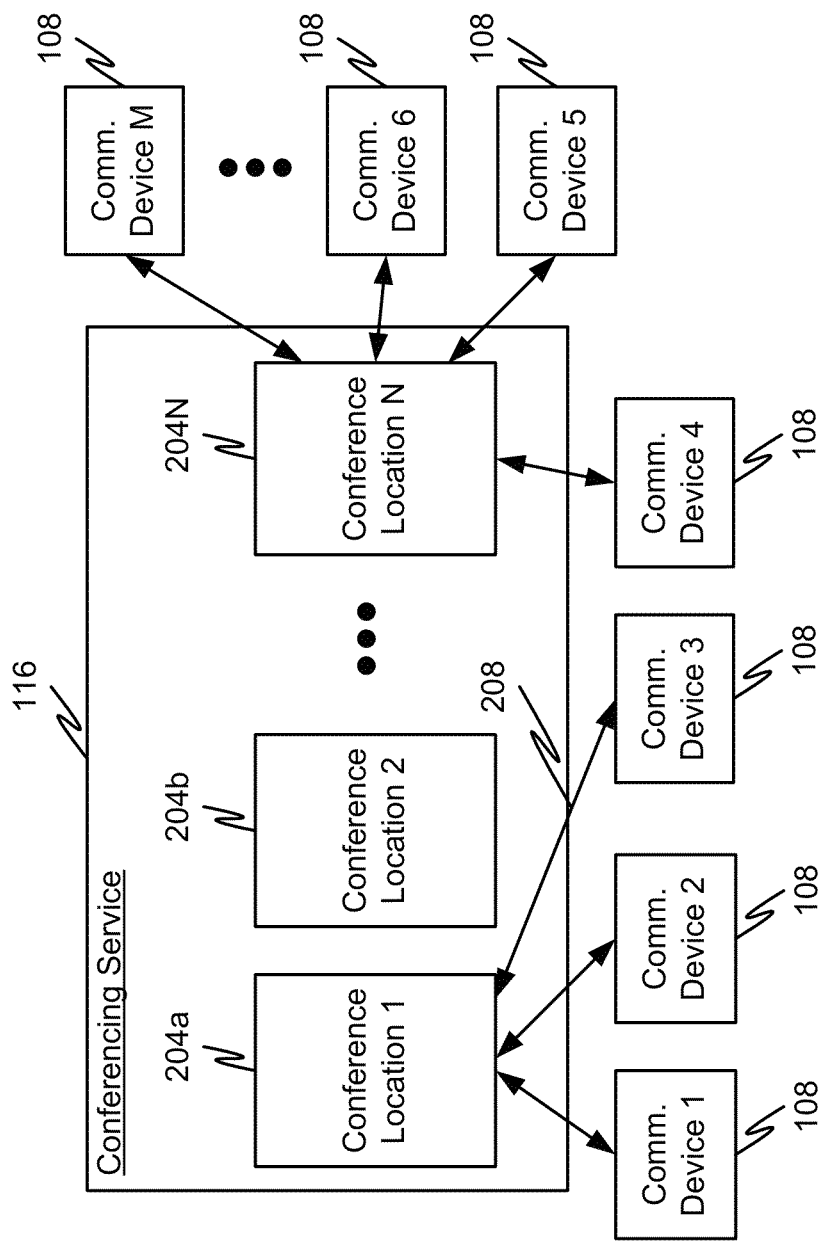
FIG. 2A is a block diagram depicting a first conference configuration in accordance with embodiments of the present disclosure.
Figure 2B:
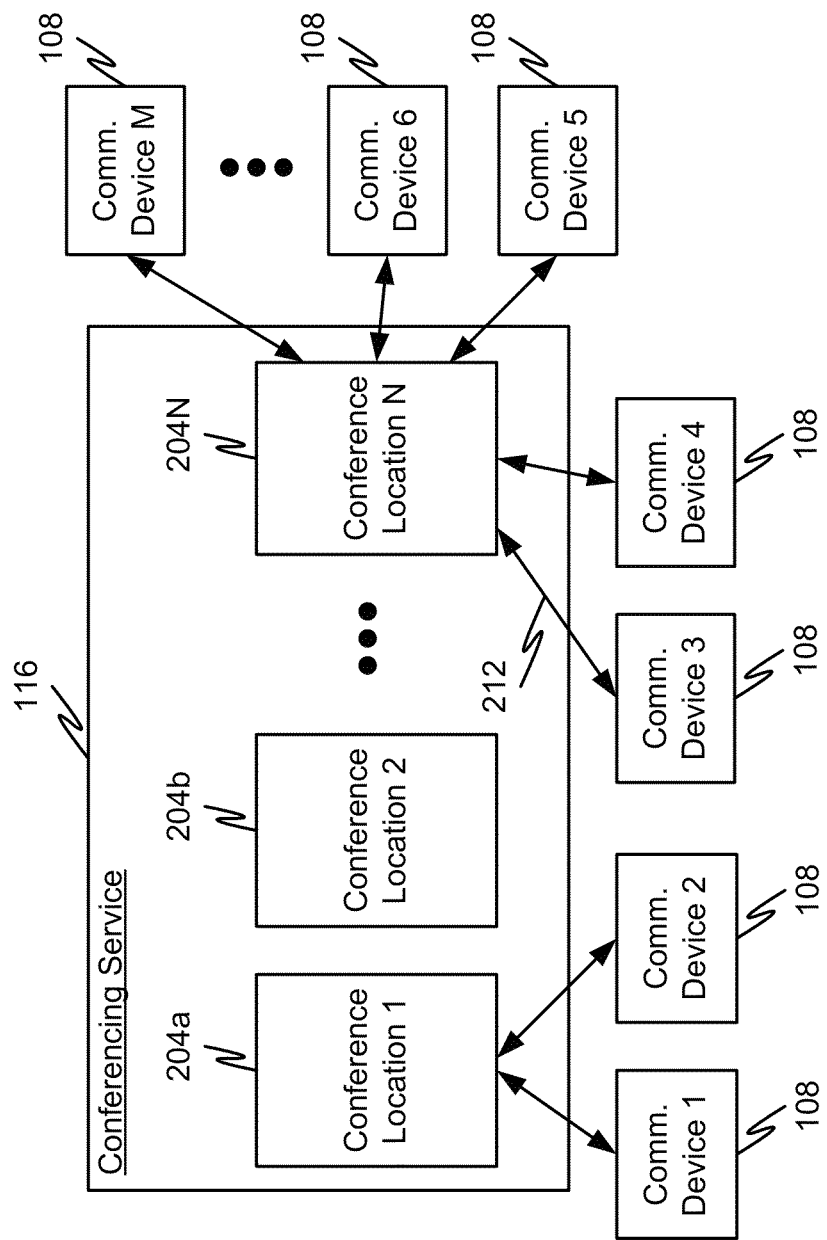
FIG. 2B is a block diagram depicting a second conference configuration in accordance with embodiments of the present disclosure.
Figure 2C:
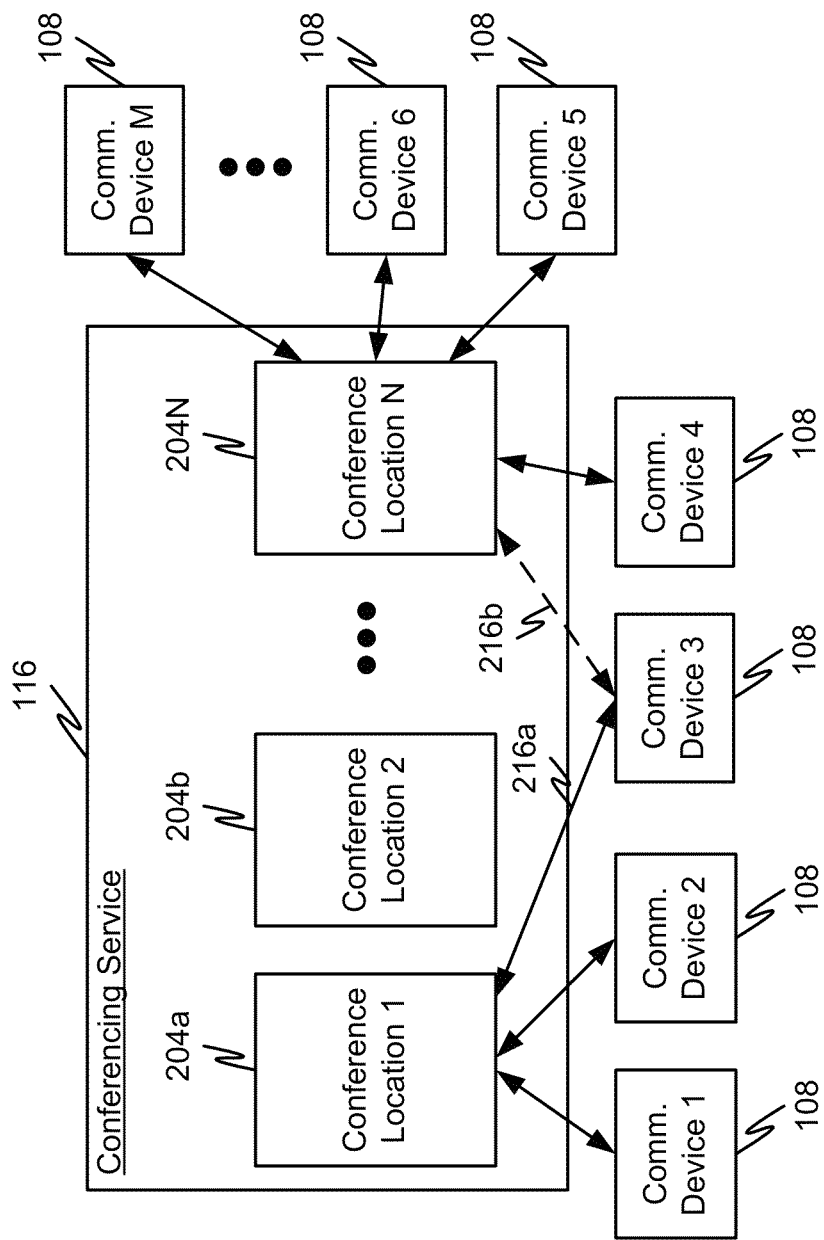
FIG. 2C is a block diagram depicting a third conference configuration in accordance with embodiments of the present disclosure.

In addition to enabling users 112 to initially connect to a conference mixer 124, the conference admission manager(s) 120 may also be configured to facilitate the transfer of participants between conferences and/or enable participants to toggle between conferences that are occurring simultaneously at the conferencing service 116. With reference now to FIGS. 2A-C, several different conference configurations and the behavior of the conference admission manager 120 to facilitate the transition between conference configurations will be described in accordance with at least some embodiments of the present disclosure. In particular, the conference admission manager(s) 120 may be provided with functionality that analyzes in-band signaling between a communication device 108 and a conference mixer 124 during a conference (e.g., while the communication device 108 is connected to the conference mixer 124 and a user 112 is acting as a participant in such a conference). If the conference admission manager 120 detects a particular in-band signal indicating a command to transfer or toggle between conferences, the conference admission manager 120 is configured to identify the location of the next conference and transfer the communication device 108 that transmitted the transfer/toggle command from one conference to another.

With reference to FIG. 2A, a first conference configuration is depicted where two conferences are occurring at two different conference locations 204a and 204N in the conferencing service 116. It should be appreciated that a conferencing service 116 may be adapted to support more than two concurrent conferences between different communication devices 108. Specifically, the number of conferences that can be concurrently supported and the size thresholds of those conferences may be limited by the number of conference mixers 124 and other conferencing infrastructure 128 provided by the conferencing service 116. In some embodiments, each different conference location 204a-N may correspond to a different conference mixer and each conference location 204a-N may be accessible via different participation and/or host codes.

As an example, a first and Mth user may each independently call into the conferencing service 116 by dialing a common telephone number. Upon connecting with the conferencing service 116, the first user may provide a first participation code, thereby causing the communication device 108 of the first user to connect with a first conference location 204a (e.g., a first conference mixer 124). On the other hand, the Mth user may provide an Nth participation code, thereby causing the communication device 108 of the Mth user to connect with an Nth conference location 204N (e.g., an Nth conference mixer 124). It should be appreciated that M does not necessarily have to equal N and both M and N may correspond to any integer value that is greater than or equal to one. Moreover, the first and Nth conference may, but are not required to, occur simultaneously on the conferencing service. In some embodiments, the Nth conference may be scheduled to occur immediately after the first conference is scheduled to end. However, participants may be allowed to access the conference locations 204a-N a predetermined amount of time before and/or after a conference is scheduled to occur, thereby creating the problem of back-to-back conferences.

Specifically, as can be seen in the sequence of FIGS. 2A and 2B, a third communication device 108 may initially be connected to the first conference locations 204a (e.g., the user of the third communication device 108 may initially be a participant in the first conference that is occurring at the first conference location 204a). At some point during the first conference or immediately after the first conference has terminated the user of the third communication device 108 may desire to transfer directly to his/her next conference that is being held at the Nth conference location 204N. The transfer from the first conference to the Nth conference may be achieved by the third communication device 108 transmitting one or more in-band signals to the conferencing service 116 while the third communication device 108 is connected to the first conference location 204a.

A conference admission manager 120 may reside between the third communication device and each conference location 204a or it may be included as a component of the first conference location 204a. In either configuration, the conference admission manager 120 may be adapted to intercept the in-band signal(s) transmitted by the third communication device 108 during the first conference and determine that the third communication device is to be transferred. The in-band signals transmitted by the third communication device 108 may also provide the new participation and/or host code required for the user of the third communication device 108 to join the Nth conference at the Nth conference location 204N. Upon receiving the appropriate commands from the third communication device 108, the conference admission manager 120 may cause the third communication device 108 to be transferred from the first conference location 204a to the Nth conference location 204N without requiring the third communication device 108 to hang up and redial the same telephone number that was used to access the first conference. The resulting conference configuration (e.g., after the transfer is effected) is depicted in FIG. 2B.

The technique might be used also to "reconnect" device 108 to the same conference location with a different role. For instance, the system may automatically change a participant's role from moderator to participant or vice versa by, for example, changing an access code for the participant.

As can be seen in FIG. 2C, the third communication device 108 does not necessarily have to perform a transfer between the first and Nth conference. Rather, media channels 216a and 216b may be simultaneously maintained between the third communication device 108 and each of the conference locations 204a and 204N, respectively. In some embodiments, a single conference admission manager 120 may facilitate the toggling of the third communication device 108 back and forth between conferences. In some embodiments, multiple conference admission managers 120 (e.g., a first conference admission manager 120 associated with the first conference location 204a and an Nth conference admission manager 120 associated with the Nth conference location 204N) may operate cooperatively to facilitate toggling between conferences.

As used herein, the term toggling can include any process where a communication device 108 maintains two or more media channels or communication sessions with two or more conference locations, but where less than all of the maintained channels provide all of the content of the conference to the communication device 108. Each of the concurrently maintained channels may be switched between various states of active and inactive depending upon inputs received from the user 112 of the communication device 108.

As one non-limiting example, the user 112 of a communication device 108 may toggle between the first conference and Nth conference where both conferences correspond to audio conference calls. The act of toggling in this scenario may cause one audio channel to be muted from the communication device 108 to one conference mixer 124 whereas the other audio channel is carrying data bi-directionally between the communication device 108 and the conference mixer 124. In this example, the user 112 of the communication device 108 may continue to receive and hear audio from both conferences (e.g., one as a primary audio and the other as a background audio), but the user's 112 audio input at the communication device 108 may only be provided to one of the conferences.

The above example may be slightly modified by still having audio content from both conferences provided to the user 112, but one of the conferences may be provided audibly whereas another of the conferences may be converted into text for the user 112 to read.

A further modification of the above example would be to completely stop transmitting media over an inactive audio channel. In this modification, the user 112 would be allowed to control which channel is active/inactive, but the user 112 would only exchange content with one conference. If the user 112 elects to switch one channel from inactive to active, the other channel(s) may be automatically switched to an inactive state. The act of toggling or switching the active/inactive status of communication channels may be facilitated by the transmission of in-band commands from the communication device 108 to the conference admission manager 120 and the analysis and execution of such commands by the conference admission manager 120.

As another non-limiting example of toggling between conferences, the user 112 of a communication device 108 may be simultaneously involved in the first conference, which is a multimedia conference, and the Nth conference, which is an audio conference call. The user 112 may provide appropriate in-band signals to the conference admission manager 120 that indicate the user 112 wants to be completely involved in the Nth conference (e.g., the audio conference call), but still wants to interact with the non-audio aspects of the first conference (e.g., the multimedia conference). In this embodiment, and in response to receiving the appropriate in-band signals from the communication device 108, the conference admission manager 120 may either deactivate or tear down the audio communication channel between the communication device and the first conference location 204a, but other non-audio communication channels (e.g., web connections, communication sessions supporting text communications such as chats, Instant Messaging (IM), etc.) may be maintained between the communication device 108 and the first conference location 204a. On the other hand, the communication channel between the communication device 108 and the Nth conference location 204N may be maintained in its entirety, unless a command is received to toggle back to the audio portion of the first conference.

As can be seen above, the concept of toggling is slightly different from that of transferring because toggling involves maintain communication channels in the event that the user 112 desires to re-establish his/her connection with a previous conference. A transfer, on the other hand, may involve tearing down and reallocating media ports in the conferencing service 116 for other uses (e.g., different conferences).

Figure 3:
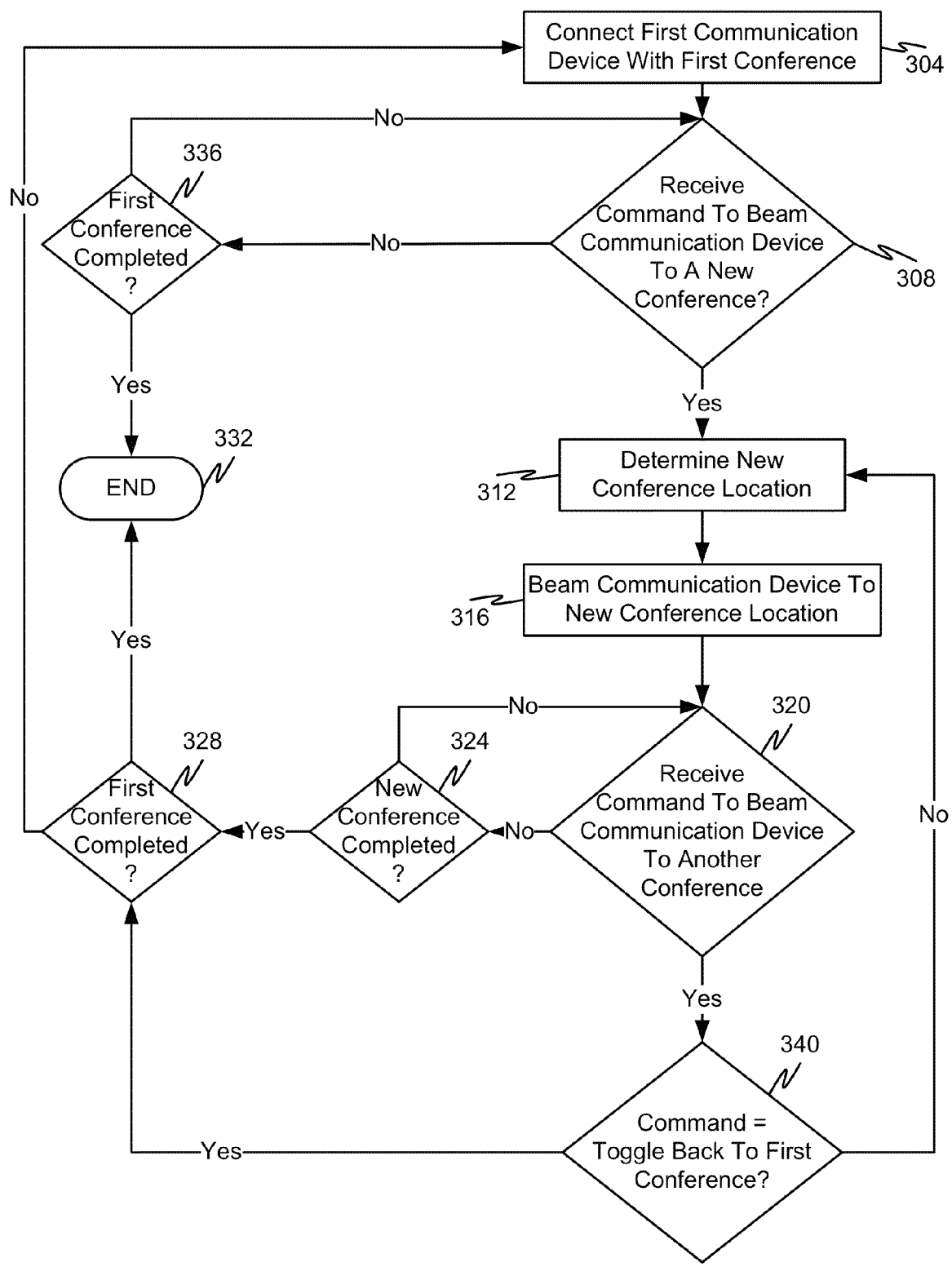
FIG. 3 is a flow diagram depicting a communication method in accordance with embodiments of the present disclosure.

With reference now to FIG. 3, a communication method will be described in accordance with at least some embodiments of the present disclosure. The communication method depicted in FIG. 3 may correspond to a method that enables a user 112 to beam between concurrent conferences, beam between back-to-back conferences, toggle between concurrent conferences, or the like. The method is initiated when a first communication device 108 is connected with a first conference (step 304). As discussed above, the first connection between the first communication device 108 and the first conference may occur after the user 112 of the first communication device 108 has both contacted the conferencing service 116 as well as provided a valid participation/host code for the first conference to the conference admission manager 120. The first conference may be a conference between two, three, four, five, or more participants via two, three, four, five, or more different communication devices. It should be appreciated that the number of participants in the first conference does not necessarily have to equal the number of communication devices 108 involved in the first conference due to the fact that some participants may be sharing a communication device 108.

While the first communication device 108 is connected to the first conference, a conference admission manager 120 may analyze activity of the conference to determine if the first communication device 108 has provided one or more in-band signals during the conference that correspond to a command to beam the first communication device to a new conference (step 308). In particular, the conference admission manager 120 may analyze some or all communications received at the first conference location that is hosting the first conference. In some embodiments, the conference admission manager 120 may analyze all communications for an in-band DTMF signal or series of DTMF signals that correspond to a command to beam a communication device 108 involved in the first conference to a different conference. In some embodiments (e.g., a SIP or H.323 embodiment), the conference admission manager 120 may only need to analyze a signaling path (and not a media path) for the command to beam the communication device 108 from the first conference to a different conference. In some embodiments, the conference admission manager 120 may analyze all http exchanges between the communication device 108 and first conference to determine if a CCMP or similar type of command has been received indicating a desire to transfer.

If such a command is not detected, the process will continue by determining if the first conference has terminated (step 336). If not, the process returns to step 308. If, however, the first conference has completed and the conference admission manager 120 has not received a command to beam the first communication device 108 to a different conference, the method will terminate (step 332). It should be appreciated, however, that the query of step 336 may not necessarily be answered affirmatively if the conference ends and a beaming command has not been received before the conference ending. Rather, conference participants may be provided a predetermined amount of time to beam between conferences even after the first conference has ended. For example, the first conference may be completed and as other participants are hanging up on the first conference the user 112 of the first communication device 108 may maintain his/her connection with the conference location that is hosting the first conference. After this connection is maintained and no other participant is detected as being connected to the conference location, the user 112 may then provide the beaming command. Moreover, the beaming command that is provided after all other participants have disconnected from the conferencing service 116 may be provided in response to a query or in the absence of a query originated by the conference admission manager 120 (e.g., a query such as "I noticed you are connected to a completed conference, would you like me to transfer you to your next conference?"). However, if a predetermined amount of time passes after the first conference has terminated, the query of step 336 may be answered affirmatively and the method may end at step 332.

Referring back to step 308, if a beaming command is received at the conference admission manager 120, the method may continue with the conference admission manager 120 determining the location of the new conference (step 312). The location of the new conference may be determined, entirely or in part, based on a participation or host code provided by the user 112 of the first communication device 108 or known to the system by other means. The participation or host code may be provided immediately after the beaming command is received or as a part of the beaming command received in step 308. In some embodiments, the next conference may actually be hosted at the same conference location and more specifically at the same conference mixer 124. In other embodiments, the next conference may have a different location than the first conference and, therefore, it may be necessary to transfer the first communication device 108 from the location of the first conference to the location of the next conference.

Accordingly, once the location of the new conference has been determined, the method continues with the conference admission manager 120 beaming the first communication device 108 to the next conference (step 316). In some embodiments, beaming may involve the act of transferring the first communication device 108 to the next conference and tearing down any communication channels that were previously established between the first communication device 108 and the first conference. Alternatively, beaming may involve the act of establishing a second communication channel between the first communication device 108 and the next conference location while maintaining the communication channel between the first communication device 108 and the first conference location.

After the first communication device 108 has been beamed to the next conference, the method continues with the conference admission manager 120 again determining if a beaming command has been received from the first communication device 108 (step 320). Such a subsequent beaming command (e.g., a second beaming command received after a first beaming command) may be interpreted as a further request for a transfer, as a request to toggle back to the first conference, or as a request to establish yet another communication channel with another conference (e.g., in addition to an already-established communication channel with one or both of the first conference and any subsequent conferences).

If the query to step 320 is answered negatively, then the method continues with the conference admission manager 120 determining if the new conference (e.g., the conference that was beamed to from the first conference) has completed (step 324). If the new conference has not completed, then the method returns to step 320. If the new conference has completed, then the process continues with the conference admission manager 120 further determining if the first conference has completed (step 328). If the first conference has also terminated, then the method ends at step 332.

If, on the other hand, the first conference is still in progress and a communication channel was maintained between the first communication device 108 and the first conference, then the first communication device 108 may be automatically re-connected with the first conference (step 304). Of course, this step may not occur automatically and, instead, may require a positive indication from the user 112 of the first communication device 108 that he/she desires to be beamed back to the first conference. As can be appreciated, the beaming of the first communication device 108 back to the first conference may be performed without receiving the participation and/or host code again from the user 112, although such a step is not precluded. Further still, it may not be necessary to maintain the communication channel between the first communication device 108 and the first conference for the method to proceed from step 328 to step 304. Rather, if the communication channel between the first communication device 108 and the first conference was torn down in response to the first communication device 108 beaming to another conference, the conference admission manager 120 may establish a new communication channel between the first communication device 108 and the first conference location if the query to step 328 is answered affirmatively.

Referring back to step 320, if a second beaming command is received, the method continues with the conference admission manager 120 determining whether the newly-received beaming command corresponds to a command to toggle back to the first conference or whether the newly-received beaming command corresponds to a command to connect with yet another new conference (step 340). If the newly-received beaming command corresponds to a toggle command, then the method proceeds to step 328. Otherwise, the method proceeds to step 312 where the location of the new conference is determined yet again. Of course, the location of the additional new conference may be the same as any of the preceding conferences, but such a situation is not required.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    receiving a request, from a first participant, to dial into a first conference call at a first location;
    receiving, during the first conference call, a command from the first participant of the first conference call to be beamed from the first conference call to a second conference call, wherein the first conference call is facilitated by a conferencing service at the first location;
    receiving information that identifies a location of the second conference call, wherein the second conference call is facilitated by the conferencing service at a second location, wherein the second conference call requires the first participant to provide at least one of a different participation code and host code from the first conference call, and wherein the first location and the second location use a same access number, wherein the first location corresponds to a first address of a first conference mixer and wherein the second location corresponds to a second address of a second conference mixer and wherein the information that identifies the location of the second conference call is received automatically from a calendar of the first participant; and
    beaming the first participant to the second conference call without requiring the first participant to hang up and without requiring redialing the same access number, wherein beaming the first participant to the second conference call without requiring the first participant to hang UP and without requiring redialing the same access number further comprises:
        determining that the first participant entered a participant code for the second conference call instead of a host code for the second conference call;
        determining that the first participant is actually scheduled to be a host for the second conference call; and
        joining the first participant to the second conference call as a host of the second conference call rather than as a participant of the second conference call.

2. The method of claim 1, wherein a first communication channel is established between a first communication device operated by the first participant and the first conference mixer that is hosting the first conference call to facilitate the first participant's interaction with the first conference call and wherein beaming comprises establishing a second communication channel between the first communication device and the second conference mixer that is hosting the second conference call to facilitate the first participant's interaction with the second conference call.

3. The method of claim 2, wherein the first communication channel is terminated after the second communication channel is established.

4. The method of claim 3, further comprising:
    receiving, during the second conference call, a second command from the first participant to be beamed from the second conference call to a third conference call;
    receiving information that identifies a location of the third conference call, wherein the third conference call is facilitated by the conferencing service at a third location and wherein the third conference call requires the first participant to provide at least one of a different participation code and host code from the second conference call; and
    beaming the first participant to the third conference call without requiring the first participant to hang up.

5. The method of claim 2, wherein the first communication channel is maintained concurrently with the second communication channel.

6. The method of claim 5, further comprising:
    receiving, during the second conference call, a second command from the first participant to be beamed from the second conference call back to the first conference call;
    in response to receiving the second command, changing the first communication channel from an inactive state to an active state, wherein changing the first communication channel from the inactive state to the active state causes media from the first conference mixer to be provided to the first communication device; and
    optionally changing the second communication channel from an active state to an inactive state, wherein changing the second communication channel from the active state to the inactive state causes media from the second conference mixer to stop being provided to the first communication device.

7. The method of claim 1, wherein at least one of the first and second conference comprise a multimedia conference.

8. The method of claim 1, wherein a first communication channel is maintained concurrently with a second communication channel and further comprising:
    determining if the second conference has terminated; and in response to determining that the second conference has terminated, automatically re-connecting with the first conference.

9. The method of claim 1, wherein the first conference call is at least one of an audio-based teleconference, a video-based teleconference, a web conference, and a multimedia conference.

10. A non-transitory computer readable medium having stored thereon instructions that cause a computing system to execute a method, the instructions comprising:
   instructions configured to receive a request, from a first participant, to dial into a first conference call at a first location;
   instructions configured to receive, during the first conference call, a command from the first participant of the first conference call to be beamed from the first conference call to a second conference call, wherein the first conference call is facilitated by a conferencing service at the first location;
   instructions configured to receive information that identifies a location of the second conference call, wherein the second conference call is facilitated by the conferencing service at a second location, wherein the second conference call requires the first participant to provide at least one of a different participation code or host code from the first conference call, and wherein the first location and the second location use a same access number, wherein the first location corresponds to a first address of a first conference mixer and wherein the second location corresponds to a second address of a second conference mixer, and wherein the information that identifies the location of the second conference call is received automatically from a calendar of the first participant; and
   instructions configured to beam the first participant to the second conference call without requiring the first participant to hang up and without requiring redialing the same access number, wherein beaming the first participant to the second conference call without requiring the first participant to hang up and without requiring redialing the same access number further comprises:
      instructions configured to determine that the first participant entered a participant code for the second conference call instead of a host code for the second conference call;
      instructions configured to determine that the first participant is actually scheduled to be a host for the second conference call; and
      instructions configured to join the first participant to the second conference call as a host of the second conference call rather than as a participant of the second conference call.

11. The computer readable medium of claim 10, wherein the at least one of a different participation code and host code of the second conference is used to identify the second location of the second conference.

12. The computer readable medium of claim 10, wherein a first communication channel is established between a first communication device operated by the first participant and the first conference mixer that is hosting the first conference call to facilitate the first participant's interaction with the first conference call and wherein beaming comprises establishing a second communication channel between the first communication device and the second conference mixer that is hosting the second conference call to facilitate the first participant's interaction with the second conference call.

13. The computer readable medium of claim 10, wherein the command comprises a Telephone User Interface (TUI) code.

14. The computer readable medium of claim 10, wherein the command comprises a Cipher Block Chaining Message (CCMP) code.

15. The computer readable medium of claim 10, wherein the command comprises a Session Initiation Protocol (SIP) message, wherein the SIP message is a SIP REFER message that comprises a Refer-To header that has a conference focus Uniform Resource Identifier (URI).

16. The computer readable medium of claim 10, wherein the first participant accesses the first conference by dialing a predetermined number and then providing a first participation code and wherein the first participant accesses the second conference by providing a second participation code along with the command.

17. The computer readable medium of claim 10, wherein the command received from the first participant is received as a part of in-band signaling transmitted during the first conference.

18. A conferencing system, comprising:
   a first conference location, the first conference location including a first conference mixer that is configured to mix content from a first plurality of conference participants and provide the mixed content back to the first plurality of conference participants, wherein the first conference location is accessible to a user that provides a first participation code, wherein the first conference location corresponds to a first address of the first conference mixer, and wherein the user dials into a first conference at the first conference location;
   a second conference location, the second conference location including a second conference mixer that is configured to mix content from a second plurality of conference participants and provide the mixed content back to the second plurality of conference participants, wherein the second conference location is accessible to the user that provides a second participation code that is different from the first participation code, wherein the first conference location and the second conference location use a same access number, wherein the second conference location corresponds to a second address of the second conference mixer, and wherein information that identifies the location of the second conference call is received automatically from a calendar of the user; and
   a conference admission manager that is configured to enable the user of the first conference hosted at the first conference location to beam to a conference hosted at the second conference location without requiring the user to hang up and without requiring redialing the same access number, wherein beaming the user to the second conference call without requiring the user to hang up and without requiring redialing the same access number further comprises: determining that the user entered a participant code for the second conference call instead of a host code for the second conference call; determining that the user is actually scheduled to be a host for the second conference call; and joining the user to the second conference call as a host of the second conference call rather than as a participant of the second conference call.

19. The conferencing system of claim 18, wherein the conference hosted at the first conference location is at least one of an audio-based teleconference, a video-based teleconference, a web conference, and a multimedia conference.

20. The conferencing system of claim 18, wherein the conference admission manager is enabled to beam the user between the first and second conference locations in response to receiving at least one of a Telephone User Interface (TUI) code, a Cipher Block Chaining Message (CCMP code), and a Session Initiation Protocol (SIP) message.

\* \* \* \* \*

UNITED STATES PATENT AND TRADEMARK OFFICE
CERTIFICATE OF CORRECTION

| | | |
|---|---|---|
| PATENT NO. | : 8,908,843 B2 | Page 1 of 1 |
| APPLICATION NO. | : 13/426332 | |
| DATED | : December 9, 2014 | |
| INVENTOR(S) | : Moni Manor | |

It is certified that error appears in the above-identified patent and that said Letters Patent is hereby corrected as shown below:

In the Claims

At column 14, line 4, please delete "UP" and replace it with --up-- therein.

Signed and Sealed this
Twenty-first Day of July, 2015

Michelle K. Lee
*Director of the United States Patent and Trademark Office*